United States Patent [19]

Boella et al.

[11] Patent Number: 4,650,993

[45] Date of Patent: Mar. 17, 1987

[54] OPTICAL POSITION TRANSDUCER HAVING A PLURALITY OF PHOTODETECTOR CELLS OF VARYING AREA

[75] Inventors: Marcello Boella, Loranzè ; Paolo Rivera, Strambino, both of Italy

[73] Assignee: C. Olivetti & C., S.p.A., Ivrea, Italy

[21] Appl. No.: 652,098

[22] Filed: Sep. 19, 1984

[30] Foreign Application Priority Data

Sep. 30, 1983 [IT] Italy ............................... 68006 A/83

[51] Int. Cl.$^4$ ............................................... G01D 5/34
[52] U.S. Cl. ............................ 250/231 SE; 340/347 P
[58] Field of Search ...................... 250/231 SE, 237 G; 340/347 P; 356/395; 33/125 C

[56] References Cited

U.S. PATENT DOCUMENTS 3,757,128 9/1973 Vermeulen .................... 250/231 SE
4,224,514 9/1980 Weber ............................ 250/231 SE
4,496,835 1/1985 Boella et al. ..................... 250/231 SE

Primary Examiner—Edward P. Westin
Assistant Examiner—William L. Oen

Attorney, Agent, or Firm—Banner, Birch, McKie & Beckett

[57] ABSTRACT

An optical transducer for detecting the position of a rotary or translatory member comprises a light source, a photodetector group, and a shutter provided with a series of transparent elements spaced by opaque regions and interposed between the light source and the photodetector group. The photodetector group comprises an integrated circuit, on a surface of which is disposed a plurality of photovoltaic cells, each having an area which is a fraction of the area of each transparent element. The cells are divided into four groups to generate as many electrical signals which are out of phase relative to each other by 90° and which are indicative of the position of the shutter with respect to the position of the photodetector group and the light source. The cells are disposed symmetrically with respect to a central radially extending optical axis, and in such a way that the barycenter of the areas of each of the four groups is included in the central optical axis. The sum of the four electrical signals is also used as feedback for controlling the power supply for the light source.

14 Claims, 7 Drawing Figures

OPTICAL POSITION TRANSDUCER HAVING A PLURALITY OF PHOTODETECTOR CELLS OF VARYING AREA

BACKGROUND OF THE INVENTION

1. Field of the Invention

The present invention relates to an optical transducer for detecting the position of a member which is movable with respect to a fixed structure, comprising a shutter provided with a plurality of transparent regions spaced by opaque regions, and a light emitter associated with a plurality of photosensitive cells which are subdivided into at least two groups of cells to generate two corresponding electrical signals which are out of phase with each shutter and cells.

2. Description of the Prior Art

A transducer is known, wherein the individual photosensitive cells are of an area which is a fraction of the area of each transparent region of the shutter and are disposed diffusely in the area on which the beam of light emitted by the light source impinges for the purpose of eliminating the errors due to the lighting distortion caused by incorrect positioning of the light emitter and cells with respect to the shutter. In that transducer, the photosensitive cells which are divided into two groups are all of the same dimensions and are disposed in accordance with a grid of rows and columns wherein the rows are orthogonal to the longitudinal axis of the transparent regions of the shutter and the columns are parallel to those regions. In addition, the cells in a group are disposed with the columns out of phase and with rows that are alternate with respect to the cells of the other group, and the spacing between the columns of the cells of each group is constant and equal to the spacing between the transparent regions of the shutter.

However, such a method of arranging the photosensitive cells requires a very high degree of accuracy, in particular as regards the distance between the columns, which is to be strictly equal to the spacing between the transparent regions of the shutter if it is desired that the electrical signals generated by the individual groups of cells are precisely indicative of the position of the shutter relative to the light source and cells. That involves very small tolerances and thus difficulties in construction and high production costs.

SUMMARY OF THE INVENTION

The object of the present invention is to provide an economical and highly reliable transducer in which any errors as between the pitch of the transparent elements of the shutter and the pitch between the photosensitive cells does not influence the electrical signals thereof, which are indicative of the position of the shutter relative to the light source and cells.

Accordingly the invention is characterised in that the cells are disposed symmetrically wtih respect to a central optical axis and that each group of cells has its barycentre of illumination coincident with the central optical axis.

BRIEF DESCRIPTION OF THE DRAWING

The invention will be described in more detail, by way of example, with reference to the accompanying drawings, in which.

DETAILED DESCRIPTION

Figure 1:
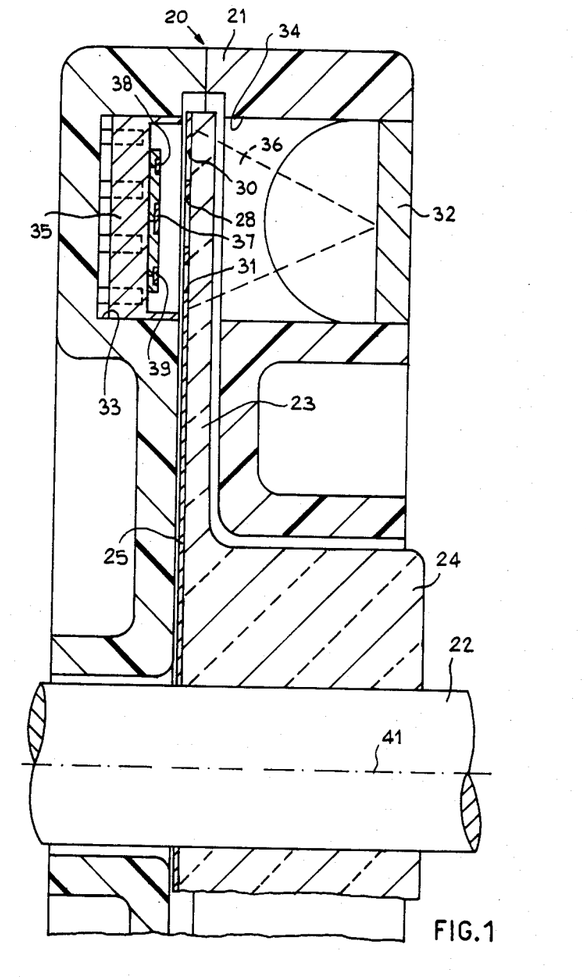
FIG. 1 is a view in cross-section of part of an optical transducer according to the invention.

Referring to FIG. 1, an optical transducer 20 according to the invention comprises a fixed structure 21, for example of plastics material, within which a shaft 22 is rotatable. The form of the structure 21 is of known type, for example as described in the published British patent application No. 2 062 220.

A shutter 23 formed by a disc of transparent material such as plastics or glass is fixed to the shaft 22 by means of a hub 24. A front surface of the disc is covered by a layer 25 of opaque material, which has a substantially peripheral circular ring (see FIG. 2) on which is disposed a plurality of transparent radial windows 28 which are angularly equally spaced from each other and which are such as to define opaque regions 29 spaced thereby. Provided in the layer 25 are also two individual radial windows 30 and 31, one being more inward and the other being more outward with respect to the windows 28. The windows 30 and 31 are much wider than the windows 28.

Figure 2:
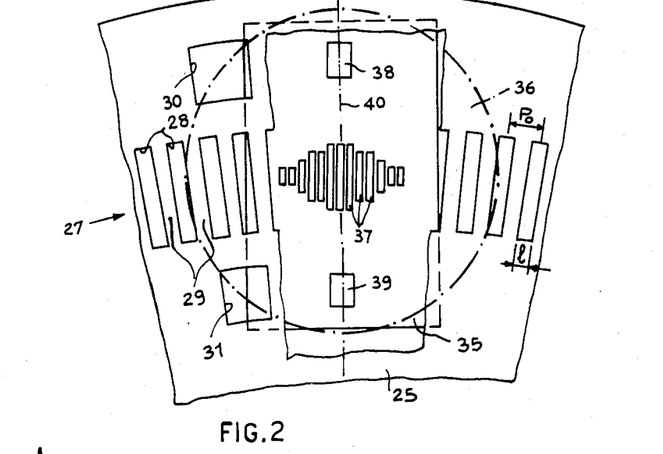
FIG. 2 is a view on an enlarged scale of a detail of the transducer shown in FIG. 1.

In the particular embodiment described herein, there are two hundred radial windows 28 and their average width 1 which is equal to half the angular pitch $P_o$ is about 0.2 mm. It will be appreciated that such data are given purely by way of indication and that in other embodiments, those parameters may be completely different.

Figure 5:
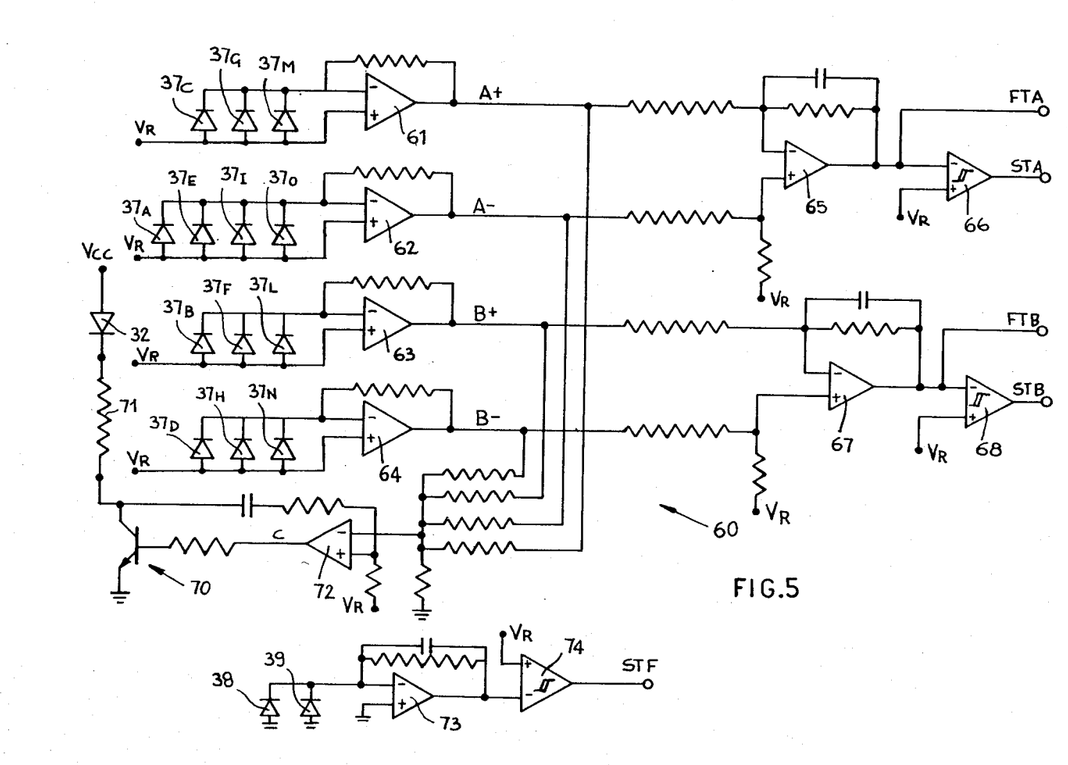
FIG. 5 is a diagram illustrating an electrical circuit of the optical transducer according to the invention.

A light source 32 (see FIG. 1) which is formed for example by a light emitting diode (LED) is disposed in a recess 34 of the structure 21, provided in front of a small sector of the circular ring 27 of the disc 23, and constantly projects towards the latter a beam of light as indicated at 36 (see FIGS. 1 and 2). Disposed in a recess 33 in the structure 21, which is in opposing relationship to the light source 32, is a light detector 35 comprising an integrated circuit, on a front surface of which is disposed a plurality of photovoltaic cells 37 which are capable of co-operating with the transparent regions 28, and two individual photovoltaic cells 38 and 39 which are capable of co-operating with the windows 30 and 31 respectively. The integrated circuit 35 also comprises an electrical circuit 60 associated with the photovoltaic cells 37, 38 and 39 and the LED 32, which is illustrated in FIG. 5 and which will be described in greater detail hereinafter.

With respect to the axis 40 (see FIG. 3) which is radial with respect to an axis of rotation 41 (see FIG. 1) of the disc 23, the photovoltaic cells 37 are disposed in a symmetrical array: that is to say, the cells which are to the right (see FIG. 3) of the axis 40 are identical to and at the same spacing as the cells which are to the left of the axis 40. In particular, in this first embodiment as described herein, the central cell is disposed on the axis 40.

Figure 3:
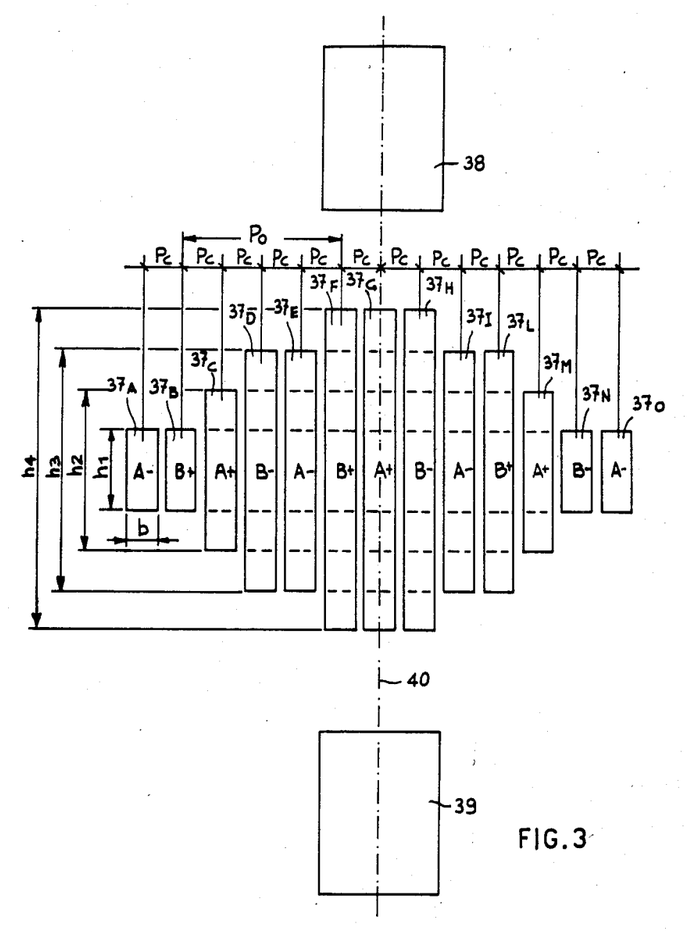
FIG. 3 is a view on a further enlarged scale of the photosensitive cells of the transducer shown in FIG. 1.

The photovoltaic cells 37 are spaced from each other by a pitch distance $P_c$ which is equal to a quarter of the pitch $P_o$ of the windows 28, are all of the same width b which is slightly less than the pitch distance $P_c$, and are of a height h which varies according to the position of each individual cell with respect to the central axis 40.

In this particular embodiment, the height is a multiple of a predetermined standard height h1 which is susbtantially equal to twice the pitch distance $P_c$. In particular the cells 37A, 37B. 37N and 37O are the most outward with respect to the axis 40 are of a height h1, the cells 37C and 37M are of a height h2 which is twice the height h1, the cells 37D, 37E, 37I and 37L are of a height h3 which is three times the height h1, and the cells 37F, 37G and 37H are of a height h4 which is four times the height h1.

In addition, the photovoltaic cells 37 are divided into four groups and the cells of each group are electrically connected together in such a way that four electrical signals which are out of phase with each other by 90° can be generated. More precisely, the cells 37A, 37E, 37I and 37O are connected together and form a signal A—, the cells 37B, 37F and 37L are connected together and form a signal B+, the cells 37C, 37G and 37M are connected together and form a signal A+ and the cells 37D, 37H and 37N are connected together and form a signal B—.

The total surface area of the photovoltaic cells of each of the four groups is equal to a predetermined common value. In the embodiment illustrated herein, it is equal to the product of the base b by eight times the height h1.

In this way, the barycentre of the sensing areas or the barycentre of illumination of each group of cells coincides with the central optical axis 40. The term barycentre of illumination is used to denote the sum of the products of the individual elementary areas of the cells in question with their distance from the axis in question.

In fact, if the group of cells 37A, 37E, 37I and 37O which combine to form the signal A— is considered, it is possible to see how the barycentre of illumination, which is calculated with respect to the central axis 40, is given by the algebraic sum of: $(h1 \cdot b \cdot 6P_c) + (3h1 \cdot b \cdot 2P_c) - (3h1 \cdot b \cdot 2P_c) - (h1 \cdot b \cdot 6P_c)$, which is equal to form the signals B+, A+ and B—, the barycentre which are calculated with respect to the axis 40 are given by the following algebraic sums:
$(h1 \cdot b \cdot 5P_c) + (4h1 \cdot b \cdot P_c) - (3h1 \cdot b \cdot 3P_c);$
$(2h1 \cdot b \cdot 4P_c) - (2h1 \cdot b \cdot 4P_c);$ and
$(3h1 \cdot b \cdot 3P_c) - (4h1 \cdot b \cdot P_c) - - (h1 \cdot b \cdot 5P_c)$ respectively,
which are all equal to zero.

The arrangement of the photovoltaic cells 37 with respect to the central axis 40 having been described, we shall now illustrate how they are electrically connected to generate the signal A—, B+, A+ and B— which, being suitably processed, form the analog and sinusoidal signals FTA and FTB which are out of phase with each other by 90°, and a reference signal C which is used as a feedback signal for the light emitter 32, for the purposes of controlling the amount of light produced. The cells 37 of each group (see FIG. 5) are connected together in parallel. In addition, each group of cells is connected to the inputs of a corresponding differential amplifier 61, 62, 63 and 64.

The common polarity of the cells 37 is connected to a reference voltage $V_R$ of about 2 volts.

The output signal A+ from the amplifier 61 and the output signal A— from the amplifier 62 are applied to a differential amplifier 65, at the output of which is generated the signal FTA (see FIGS. 5 and 6) which is converted into a square signal STA by a squaring circuit 66.

The output signal B+ from the amplifier 63 and the output signal B— from the amplifier 64 are applied to a differential amplifier 67, at the output of which is generated the signal FTB which is coverted into a square signal STB by a squaring circuit 68. In that way, the signal FTA is produced by virtue of the difference between the signals A+ and A— in phase opposition and similarly, the signal FTB is produced by virtue of the difference between the signals B+ and B— in phase opposition.

The light emitting diode 32 is connected to a supply voltage Vcc and is controlled by a transistor 70 by way of a resistor 71. The base of the transistor 70 is controlled by the output signal C from a differential amplifier 72, to an input of which the signals A+, A—, B+ and B— are applied in parallel.

The cells 38 and 39 are connected together in parallel and are connected to a differential amplifier 73 whose output is connected to a squaring circuit 74 which generates a signal STF.

The means of operation of the optical transducer as described hereinbefore is as follows:

During the rotary movements of the shutter disc 23, the light emitted by the light emitting diode 32 passes by way of the windows 28 and selectively impinges on the photovoltaic cells 37 and, in each revolution of the disc 23, also the cells 38 and 39.

Figure 4:
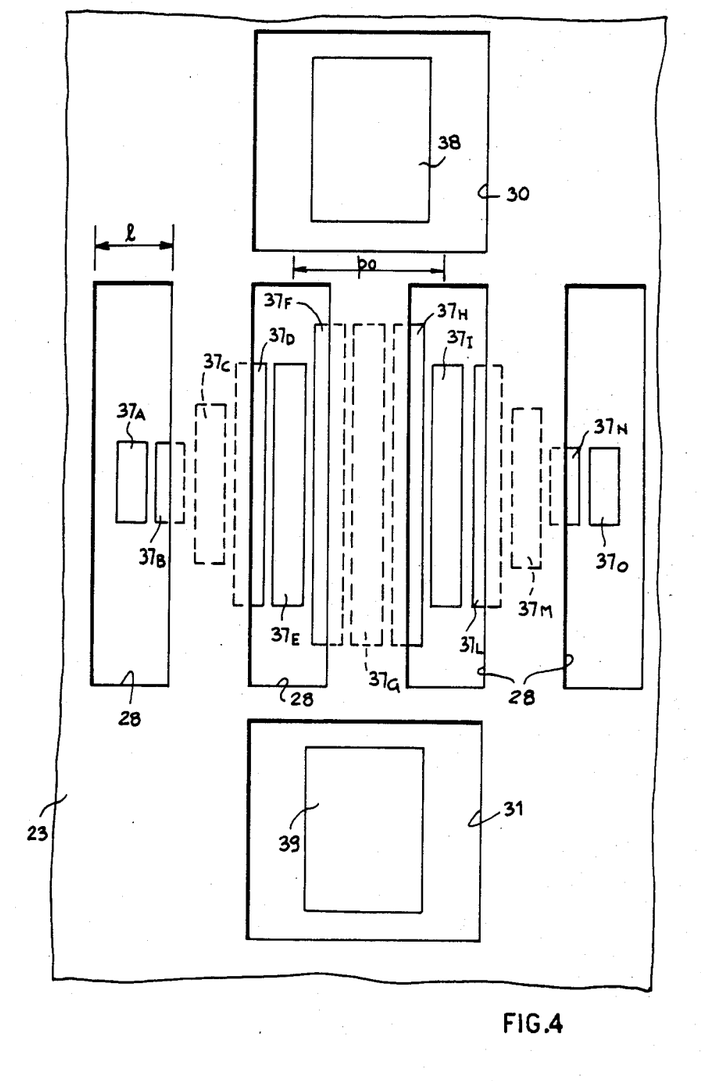
FIG. 4 is a view on an enlarged scale of the photosensitive cells and a part of the shutter of the transducer shown in FIG. 1.

FIG. 4 illustrates one of the innumerable operating conditions wherein the cells 37A, 37E, 37I and 37O are totally illuminated, the cells 37B, 37D, 37F, 37H, 37L and 37N are 50% illuminated and the cells 37C, 37G and 37M are completely in the dark. In that condition (time t1 in FIG. 6), the signal A+ generated by the cells 37A, 37E, 37I and 37D is at its maximum value, the signal A— generated by the cells 37C, 37G and 37M is at its minimum value and is thus equal to zero, while the signals B+and B— which are generated by the cells 37B, 37F and 37L and by the cells 37D, 37H and 37N respectively are at 50% of their value. In consequence, the signal FTA which is reproduced by the difference between the signals A+ and A— will be at its maximum positive value while the signal FTB which is given by the difference between the signals B+ and B— is equal to zero.

After a rotary movement of the disc 23, equal to a quarter of the pitch $P_o$, the cells 37B, 37F and 37L are totally illuminated while the cells 37D, 37H and 37N are completely dark and the cells 37A, 37C, 37E, 37G, 37I and 37M are 50% illuminated. In that new condition which is not shown in the drawings but which can be easily deduced, the signal FTA is at zero (time t2 in FIG. 6), with the signal A+ being equal to the signal A—, while the signal FTB is at its maximum positive value, the signal B+ being at its maximum value and the signal B— being equal to zero.

After a further rotary movement of the disc 23, equal to a quarter of the pitch $P_o$, it is the cells 37C, 37G and 37M which are totally illuminated while the cells 37A, 37E, 37I and 37O are completely in the dark and the cells 37B, 37D, 37F, 37H, 37L and 37N are 50% illuminated. In that new condition (time t3 in FIG. 6), the signal FTA is at its maximum negative value, with the signal A+ being equal to zero and the signal A— being at its maximum value, while the signal FTB is at zero, with the signal B+ being equal to the signal B−.

After a further rotary movement of the disc, equal to a quarter of the pitch $P_o$, it is the cells 37D, 37H and 37N which are completely illuminated while the cells 37B, 37F and 37L are completely in the dark and the cells 37A, 37C, 37E, 37G, 37I and 37M are 50% illuminated. In consequence, in that condition (time t4 in FIG. 6), the signal FTA is again at zero, with the two signals A+ and A− being equal to each other, while the signal FTB at its maximum negative value, the signal B− being at its maximum value and the signal B+ being equal to zero.

Figure 6:
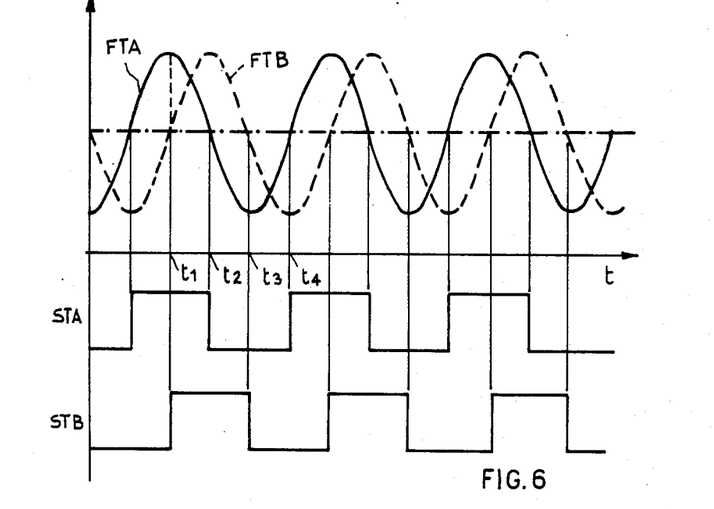
FIG. 6 is a diagram representing some electrical signals of the circuit shown in FIG. 5.

The signal C which is given by summing of signals A+, A−, B+ and B− is always substantially constant throughout the cycle described hereinbefore and for all subsequent cycles.

The arrangement of the cells in accordance with the above-described criterion guarantees perfect predetermined out-of-phase relationship, being in this case through 90°, as between the signals FTA and FTB. Any errors as between the pitch $P_o$ of the windows 28 of the disc 23 and the pitch $P_c$ as between the individual cells, which, as will be recalled, are in a very precise ratio relative to each other, has no effect on the correct out-of-phase relationship as between the two signals. In fact, any such errors would in any case be compensated for by the fact that, with respect to the central optical axis 40, the cells are arranged symmetrically and with the optical barycentre of each group coincident with the axis 40.

Figure 7:
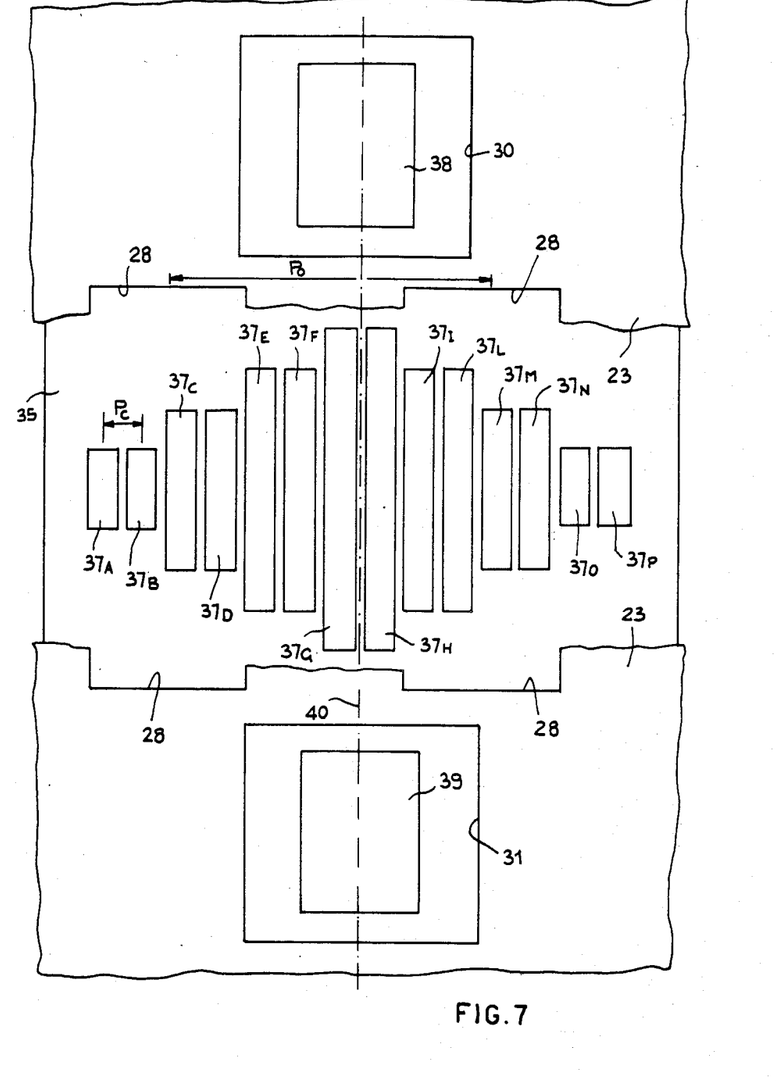
FIG. 7 is a front view of the photosensitive cells and the shutter of another transducer according to the invention.

In accordance with another embodiment which is diagrammatically illustrated in FIG. 7, the number of windows 28 is halved with respect to the number in the disc 23 described hereinbefore. In that way, the pitch $P_o$ may be about 0.4 mm, eight times the pitch $P_c$ as between the individual cells 37, which remains the same as the above-described embodiment. Changing the ratio between the pitch distances $P_c$ and $P_o$ however also involves a different arrangement in respect of the cells 37 with respect to the central optical axis 40, so that the above-described general criterion relating to the symmetrical positioning and the optical barycentre is always fulfilled.

In particular, in this second embodiment, the cells 37A, 37B, 37I and 37L are connected together to generate the signal A−; the cells 37C, 37D, 37M and 37N are connected together to generate the signal B+; the cells 37E, 37F, 37O and 37P are connected together to generate the signal A+, while the central cells 37G and 37H are connected together to generate the signal B−. In that way, as can readily be seen, the cells of each group have the optical barycentre which, as we have seen, is given by the sum of the products of the individual elementary area of the cells in question by the distance thereof from the central axis 40, coincident with the axis 40.

The electronic circuit associated with the cells 37A-37O of this second embodiment is similar to that described above and illustrated in FIG. 5, and is not further represented herein.

It will be clear from the present description that the transducer 20 according to the invention is capable of detecting the position of a member which is movable with respect to a fixed structure, comprises a shutter 23 provided with a plurality of transparent elements 28 spaced by opaque regions 29, a light emitter 32 associated with a plurality of photosensitive cells 37 subdivided into at least two groups of cells to generate two corresponding electrical signals which are out of phase with each other and which are indicative of the reciprocal movement as between the shutter 23 and the cells 37, and is characterised in that the cells 37 are disposed symmetrically with respect to a central optical axis 40 and that each group of cells has the barycentre of illumination coincidence with said central optical axis 40.

It will be apparent that the above-described transducer may be the subject of modifications and addition of parts without departing from the scope of the present invention.

For example, the transducer may be of linear type wherein, in place of a rotating disc, the shutter comprises a bar provided with transparent windows spaced by opaque regions.

In addition, the above-described principle may also be applied to non-optical transducers wherein the signals generated are proportional to the sensitive areas such as magnetoresistive Hall effect transducers.

What we claim is:

1. In a optical transducer for detecting the position of a member which is movable along a given direction of movement with respect to a fixed structure comprising a shutter provided with a plurality of transparent elements and with a plurality of opaque regions spaced between said transparent elements, a light emitter for emitting a light beam illuminating a portion of said shutter and a plurality of photosensitive cells associated with said light emitter and having light sensitive areas illuminable by the light beam emerging from the transparent elements of said shutter, said photosensitive cells being subdivided into at least two groups of cells for generating two corresponding electrical signals which are out of phase with respect to each other and which are indicative of the relative position between said shutter and said cells, the improvement wherein said photosensitive cells are disposed symmetrically with respect to a central optical axis transverse to said given direction of movement and wherein each one of said groups of cells has a barycentre of said light sensitive areas included in said central optical axis.

2. A transducer according to claim 1, wherein the total area of the cells of each one of said groups is equal to a common predetermined value.

3. A transducer according to claim 1, wherein each of said two corresponding signals is obtained as combination of two combining signals 180° out of phase with respect to each other wherein the photosensitive cells of each of said two groups are subdivided into two sub-groups, wherein the cells of each of said two groups are symmetrical with respect to said central optical axis and wherein said cells of each sub-group are so disposed as to generate four electrical signals 90° out of phase with respect to each other.

4. A transducer according to claim 1, wherein said transparent elements are spaced therebetween by a first predetermined pitch, wherein said photosensitive cells are spaced therebetween by a second predetermined pitch, and wherein said second predetermined pitch is equal to an integral submultiple of said first predetermined pitch.

5. A transducer according to claim 1, wherein electrical circuit means are provided for converting said electrical signals generated by said photosensitive cells into analog and/or digital signals indicative of the reciprocal movement between said shutter and said photosensitive cells, and wherein said electrical circuit means and said photosensitive cells are disposed on a single integrated circuit.

6. A transducer according to claim 1, wherein each one of said transparent elements and each one of said photosensitive cells is of substantially rectangular shape, wherein each one of said photosensitive cells of one group is spaced according to a cell pitch with respect to two adjacent cells of the other group along said direction of movement and has its base extending parallel to said direction of movement and slightly smaller than the cell pitch between two adjacent cells.

7. A transducer according to claim 6, wherein said photosenstive cells have a height extending perpendicularly to said direction of movement which varies inversely with the distance of the cells from said optical axis and wherein the height of each cell is an integral multiple of a minimum height (h1) which is equal to the height of the cells most remote from said central optical axis.

8. An optical transducer for detecting the angular position of a rotating member with respect to a fixed structure, comprising a disc connected to said rotating member and provided in an annular region of a plurality of transparent elements and with a plurality of opaque regions spaced between said transparent elements, a light emitter for emitting a light beam illuminating a portion of said annular region and a plurality of said photosensitive cells associated to said light emitter and having light sensitive areas illuminable by the light emerging from the transparent elements of the annular region of said disc, said photosensitive cells being subdivided into at least two groups of cells for generating two corresponding electrical signals which are out of phase with respect to each other and which are indicative of the relative movement between said disc and said fixed structure, said photosensitive cells being disposed symmetrically with respect to a central radially extending optical axis, and each one of said groups of cells having a barycentre of said light sensitive areas included in said central optical axis.

9. A transducer according to claim 8, wherein said disc is rotatably mounted with respect to an axis of rotation and wherein said central radially extending optical axis is orthogonal with respect to said axis of rotation.

10. A transducer according to claim 8, wherein electrical circuit means are provided for converting said electrical signals generated by said photosensitive cells into analog and/or digital signals indicative of the reciprocal movement between said shutter and said photosensitive cells, and wherein said electrical circuit means and said photosensitive cells are disposed on a single integrated circuit.

11. A transducer according to claim 10, further comprising shell means fixed to said fixed structure, wherein said disc is rotatably mounted with clearance within said shell means and wherein said light emitter and said integrated circuit are mounted in said shell means on opposite sides with respect to said disc.

12. In an optical transducer for detecting the position of a member which is movable along a given direction of movement with respect to a fixed structure comprising a shutter provided with a plurality of transparent elements and with a plurality of opaque regions spaced between said transparent elements according to a given pitch along said given direction of movement, a light emitter for emitting a light beam illuminating a portion of said shutter and a plurality of photosensitive cells associated with said light emitter and having light sensitive areas for being illuminable by the light emerging from the transparent elements of said shutter, said photosensitive cells being subdivided into at least two groups of cells wherein the cells of each group are spaced according to said given pitch to be illuminated together by the beam emerging from a given number of said transparent elements for generating two corresponding electrical signals which are out of phase with respect to each other and which are indicative of the relative position between said shutter and said cells, the improvement wherein all said photosensitive cells of said at least two groups are disposed symmetrically with respect to a central optical axis transverse to said given direction of movement, wherein each light sensitive area is of substantially rectangular shape having a base of fixed width extending parallel to said direction of movement, wherein the amount of the products of the height of each one sensitive area at one side of said central optical axis with the distance of said one sensitive area from the central optical axis is equal to the amount of the products of the height of each other sensitive area at the other side of said central optical axis with the distance of said other sensitive area from the central optical axis, in order to cause each one of said groups of cells to have its optical barycentre included in said central optical axis.

13. A transducer according to claim 12, wherein the total area of the cells of each one of said groups is equal to a common predetermined value.

14. A transducer according to claim 12, wherein said photosensitive cells are subdivided into four groups and wherein said cells are so disposed as to generate four electrical signals 90° out of phase with respect to each other, wherein said photosensitive cells are spaced therebetween according to another pitch, and wherein said other pitch is equal to a quarter of said given pitch.

* * * * *